(12) United States Patent
Howard et al.

(10) Patent No.: US 6,629,198 B2
(45) Date of Patent: Sep. 30, 2003

(54) DATA STORAGE SYSTEM AND METHOD EMPLOYING A WRITE-AHEAD HASH LOG

(75) Inventors: John H. Howard, Cambridge, MA (US); Christopher A. Stein, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 311 days.

(21) Appl. No.: 09/733,423

(22) Filed: Dec. 8, 2000

(65) Prior Publication Data

US 2002/0073276 A1 Jun. 13, 2002

(51) Int. Cl.$^7$ .............................................. G06F 12/16
(52) U.S. Cl. ....................................... 711/112
(58) Field of Search ................................ 711/112, 156, 711/141

(56) References Cited

U.S. PATENT DOCUMENTS

| | | | |
|---|---|---|---|
| 4,507,751 A | 3/1985 | Gawlick et al. | 364/900 |
| 5,353,410 A | 10/1994 | Macon, Jr. et al. | 395/275 |
| 5,440,727 A | 8/1995 | Bhide et al. | 395/444 |
| 5,561,795 A | 10/1996 | Sarkar | 395/600 |
| 5,819,292 A * | 10/1998 | Hitz et al. | 707/203 |
| 6,243,795 B1 * | 6/2001 | Yang et al. | 711/159 |

OTHER PUBLICATIONS

International Search Report application No. PCT/US01/44832 mailed Jun. 28, 2002.
"Recovery Issues in Databases Using Redundant Disk Arrays", Mourad, et al, Academic Press, Duluth, MN, vol. 17, No. 1/2, 1993.
"How to Build a Trusted Database System on Untrusted Storage", Maheshwari, et al, USENIX Association, 4 Symposium on Operating Systems Design and Implementation, pre–2000.

* cited by examiner

Primary Examiner—Kevin L. Ellis
(74) Attorney, Agent, or Firm—Meyertons Hood Kivlin Kowert & Goetzel, P.C.; B. Noël Kivlin

(57) ABSTRACT

A data storage system includes a computer coupled to a non-volatile storage, such as a disk drive. The computer includes a block cache for storing cached copies of data blocks, and a hash table that stores hash values corresponding to the data blocks. Prior to writing back a modified cache block to the non-volatile storage, a log recorder of the computer stores an updated hash value corresponding to the modified cache block within a write-ahead hash log, which is also contained in non-volatile storage. The log recorder creates a log record including an updated hash value and an address corresponding to a modified cache block. The log recorder additionally maintains a first pointer value indicative of log records that have been stored to the write-ahead hash log, and a second pointer value indicative of the most recent log record stored in the write-ahead hash log for which a corresponding modified cache block has been stored to the non-volatile storage. These pointer values are stored in the write ahead hash log with the log records. Log records are grouped into log blocks which are eventually written to the non-volatile storage as a group. After the log record containing the updated hash value has been successfully written to write-ahead hash log, a cache manager initiates the write-back of the dirty data block to the non-volatile storage.

15 Claims, 8 Drawing Sheets

DATA STORAGE SYSTEM AND METHOD EMPLOYING A WRITE-AHEAD HASH LOG

BACKGROUND OF THE INVENTION

1. Field of the Invention

This invention relates to data storage in computer systems and, more particularly, to the storage of data blocks and associated-hash values in computer systems. The invention also relates to computer system failures and crash recovery.

2. Description of the Related Art

In many applications of computer systems, reliable storage and retrieval of data is essential. Additionally, in the event an erroneous or unintended change in data does occur, it is also often desirable in such applications that the change be detected. Much effort has therefore been devoted to developing mechanisms that provide more reliable storage and which can detect erroneous or unintended changes in data.

One prevalent form of non-volatile data storage is disk storage. Although disk drives are usually reliable, they occasionally return incorrect data for various reasons including failure to write a data block to the disk, writing a data block at the wrong location (or address) on the disk, or reading a data block from the wrong location of the disk. Other classes of errors may also be introduced due to faults in the interconnect, drive microcode, and drive buffers, among others. Such errors may not be caught by the disk drives' internal error detection mechanisms, which are typically designed to detect bit errors within a data block rather than errors resulting from misplacing an entire data block.

It is therefore desirable to perform an independent verification that the data returned in response to a read from a particular data block location (or address) is in fact the same data as was previously written to that data block address. One way to perform such a check is to compute and store a hash value (or a checksum) when writing the data block to the disk storage and to verify that hash value when reading the data block. In general, a hash value is a code which is computed from (and is thus dependent upon) the data of a block. A change in the data block may be detected by storing a hash value computed from the data block before it is stored, storing the data block and hash, retrieving the hash value when the data is read, and recomputing a new hash value based on the retrieved data. The hash retrieved from storage and the recomputed hash are then compared. If the hash values do not match, then the block of data retrieved from storage does not match the data intended to be stored. This technique requires that the hash values that are computed before the data is written be stored elsewhere on the disk (or on another device) and separate from the data block, so that they can be independently retrieved later for verification.

Unfortunately, while this technique allows for the detection of changes in data blocks during normal operations of a system, separate storage of the hash values can lead to a possible inconsistency between a newly written block of data and its corresponding updated hash value. This inconsistency can result since one of either the data block or the hash value must be written to the disk first. If a system or disk failure occurs between the two writes, the hash value and actual data may be inconsistent, thus rendering the hashing mechanism suspect at the very time it is needed most.

SUMMARY OF THE INVENTION

The problems outlined above may in large part may be solved by various embodiments of a data storage system and method employing a write-ahead hash log as described below. In one embodiment, a data storage system includes a computer coupled to a non-volatile storage, such as a disk drive, through an interconnect. The computer may include a block cache for storing cached copies of data blocks, and a hash table that stores hash values corresponding to the data blocks. Prior to writing back a modified cache block to the non-volatile storage, a log recorder of the computer stores an updated hash value corresponding to the modified cache block within a write-ahead hash log, which may also be also contained in non-volatile storage.

In one particular implementation, the log recorder may create a log record including an updated hash value and an address corresponding to a modified cache block. The log recorder may additionally maintain a first pointer value indicative of log records that have been stored to the write-ahead hash log, and a second pointer value indicative of the most recent log record stored in the write-ahead hash log for which a corresponding modified cache block has been stored to the non-volatile storage. These pointer values may be stored in the write ahead hash log with the log records. Log records may be grouped into log blocks which are eventually written to the non-volatile storage as a group. After the log record containing the updated hash value has been successfully written to write-ahead hash log, a cache manager may initiate the write-back of the dirty data block to the non-volatile storage. Until a verification has been made to ensure the corresponding dirty data block has been successfully written back to non-voliatile storage, the old hash value for the data block may also be retained in the write-ahead hash log. If a system, network or disk failure occurs between the writing of the log record containing the updated hash value to the write-ahead hash log and the writing of the corresponding dirty data block to the non-volatile storage, the hash table may be rebuilt according to the records in the write-ahead hash log.

Figure 1:
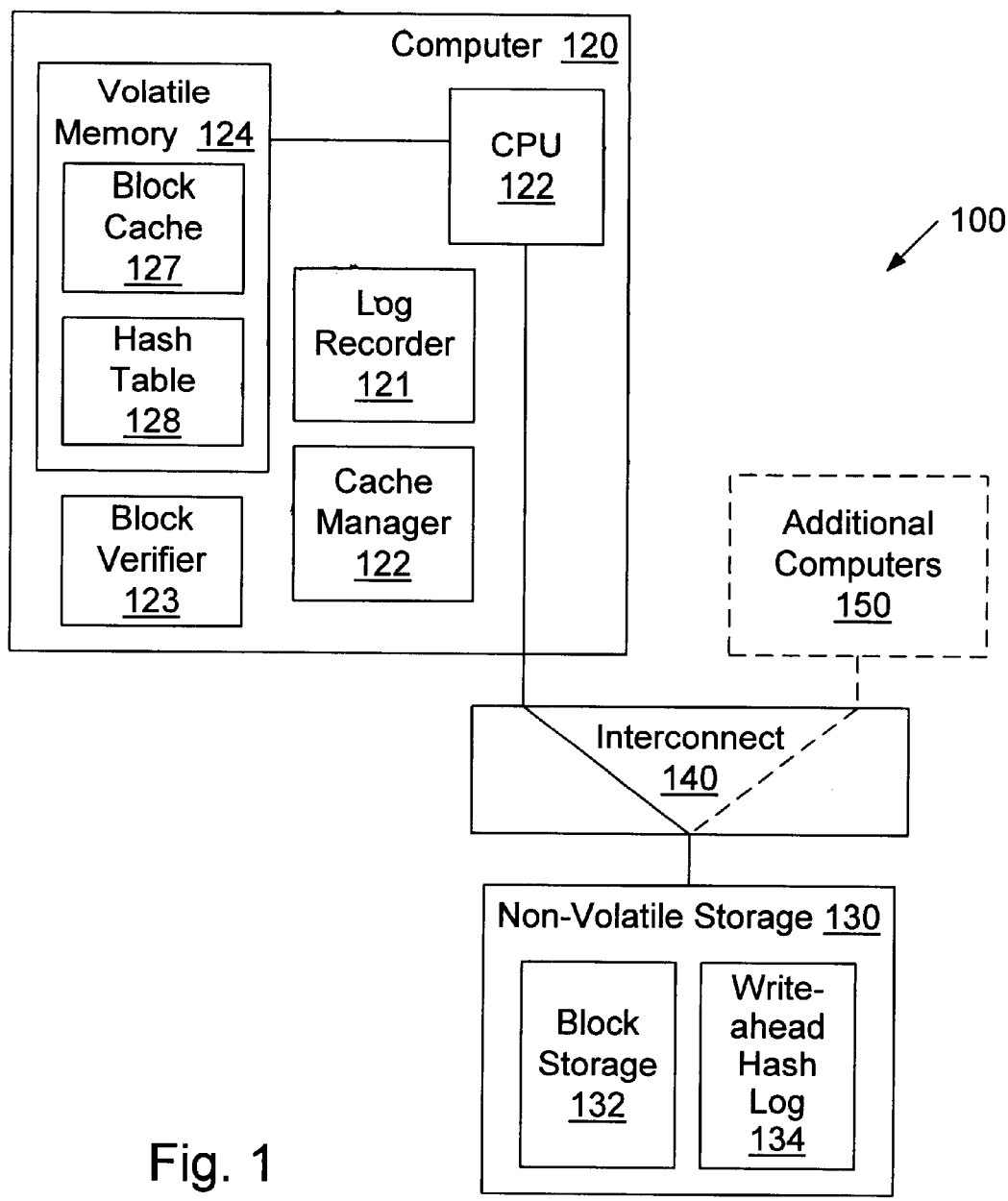
FIG. 1 is a block diagram of a system employing a write-ahead hash log.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of a system 100 is illustrated which includes a computer 120 coupled to a non-volatile storage 130 through an interconnect 140. FIG. 1 also illustrates additional computers 150 which may be similarly coupled to non-volatile storage 130 through interconnect 140.

Computer 120 includes a CPU (central processing unit) 122 operatively coupled to a volatile memory 124. It is noted that the volatile memory 124 may be physically coupled to CPU 122 through one or more buses and associated bus interfaces (not shown). Computer 120 is illustrative of any general purpose or special purpose computing device. For example, in one embodiment, computer 120 is configured to perform the functionality of a network server. Computer 120 may execute various application programs (not shown) which operate upon data whose underlying storage resides within non-volatile storage 130.

Non-volatile storage 130 is illustrative of any non-volatile type of storage, such as disk and/or tape storage. For example, non-volatile storage 130 may include one or more RAID (Redundant Array of Inexpensive Disks) devices and/or one or more stand alone disk drives, among other non-volatile storage devices. It is further noted that non-volatile storage 130 may be embodied by a collection of different non-volatile storage devices.

Interconnect 140 is representative of any type of interconnecting device, medium, or fabric. Interconnect 140 may be a high bandwidth, low latency interconnect such as an Infiniband interconnect, a Fibre Channel interconnect, or an Ethernet interconnect. In other embodiments, interconnect 140 comprises a network (for example, the Internet). In such embodiments, computer 120 may include interfacing software for connection to the network.

Volatile memory 124 may form the main system memory for computer 120. Volatile memory 124 may be implemented using, for example, DRAM (Dynamic Random Access Memory) technology.

During operation, computer 120 caches blocks of data associated with nonvolatile storage 130 within volatile memory 124, which may be performed in accordance with conventional techniques. The caching of data blocks within volatile memory 124 allows application programs executed by CPU 122 to read and write to data contained in the blocks. For this purpose, a block cache 127 within a region of volatile memory 124 is maintained to store recently used blocks of data. The portion of non-volatile storage 130 which stores the data blocks corresponding to the data blocks stored in block cache 127 is illustrated as block storage 132.

To perform an independent verification that the data returned from non-volatile storage 130 for a particular data block address is in fact the correct data (i.e., the same data as was previously meant to be written to that data block address), computer 120 maintains a hash table 128 that contains a hash value (for example, a checksum) for individual blocks of data residing in block storage 132. The hash values may be in the form of simple checksums computed from the data blocks, or may take the form of more robust hash functions, such as SHA-1, which maps a data block of any size to a 20-byte hash value, or MD5, which maps a data block to a 16-byte value. The hash values may alternatively be in the form of other error detection or error correction codes, such as a Hamming code or cyclical redundancy code. As used herein, a hash value is any code which may be computed from (and is thus dependent upon) the data of a data block, and which may be used to detect a change in the data by recomputation. A manner in which hash values may be maintained within hash table 128 will be discussed in further detail below.

A hash value corresponding to a particular data block may be accessed using the data block's address as an index into hash table 128. Thus, entries in hash table 128 may include a data block address and a corresponding hash value. Hash table 128 may be maintained within volatile memory 124, as illustrated, but may have portions of which are paged at any given instance to non-volatile storage (such as non-volatile storage 130) for space reasons (due to the limited size of volatile memory 127).

When a data block is read from non-volatile storage 130, its hash value is recomputed (i.e., using the same hash function) and is compared to the corresponding hash value stored within hash table 128. An error (or unintended change) is detected and indicated by computer 120 if the recomputed hash value does not equal the corresponding hash value stored within hash table 128 (since the hash value is a function of the data). This functionality may be performed by a thread of the operating system which is executed by CPU 122, and is depicted as block verifier 123 in the figure. The error in the data block may be the result of a failure of a device associated with the non-volatile storage 130 in writing the data block to the underlying storage medium, writing the data block at the wrong location, or reading the data block from the wrong location. Alternatively, the error may be the result of other faults, such as interconnect faults and drive microcode bugs, among others. If an error in a data block read from non-volatile storage 130 is detected by computer 120, appropriate further actions may be undertaken by block verifier 123 such as, for example, interrogating the cause of the error, warning the user, or invoking other error recovery procedures.

CPU 122 or other resources associated with computer 120 may write to a block of data within block cache 127, thus modifying the data block. A modified data block within block cache 127 is referred to as being dirty. It is noted that a dirty data block contained within block cache 127 then may be inconsistent with the corresponding data block in block storage 132. Thus, at various points during operation of computer 120, a dirty data block may be written back to the corresponding location in block storage 132 of non-volatile storage 130.

A write-ahead hash log 134 is maintained within non-volatile storage 130. During operation, write-ahead hash log 134 contains hash values associated with corresponding data blocks in block storage 132. It is noted that the write-ahead hash log 134 is logically separate from the associated data blocks within block storage 132, but may be contained in a file on the same device (e.g., disk). Alternatively, write-ahead hash log 134 may be embodied within a non-volatile storage device which is separate from the device containing block storage 132.

As will be described in further detail below, prior to writing back a dirty data block residing in block cache 127 to block storage 132, computer 120 is configured to store a new hash value corresponding to the modified data into the write-ahead hash log is 134. The new hash value is written in the form of a log record. In FIG. 1, this functionality is performed by a log recorder 121. In general, a log record is an entry containing an updated hash value corresponding to the modified data block. After the log record containing the updated hash value has been successfully written to write-ahead hash log 134, a cache manager 122 initiates the write-back of the dirty data block to block storage 132. Until a verification has been made to ensure the corresponding dirty data block has been successfully written back to block storage 132, the old hash value for the data block is also retained by write-ahead hash log 134.

It is possible that a system, network or disk failure may occur between the writing of the log record containing the updated hash value to write-ahead hash log 134 and the writing of the corresponding dirty data block to block storage 132. However, since the write-ahead hash log 134 contains a copy of the old hash value corresponding to the data block as well as the log record containing the updated hash value, computer 120 can recover from this situation and continue to detect erroneous or unintended changes to the data block. More particularly, the information contained within write-ahead hash log 134 may be used to rebuild hash table 128 regardless of whether the dirty data block was successfully written to block storage 132. Once hash table 128 has been rebuilt according to the information in write-ahead hash log 134, errors in data blocks may be detected as discussed above. Further details regarding specific implementations of log recorder 121, cache manager 122 and write-ahead hash log 134 are provided below.

Figure 2:
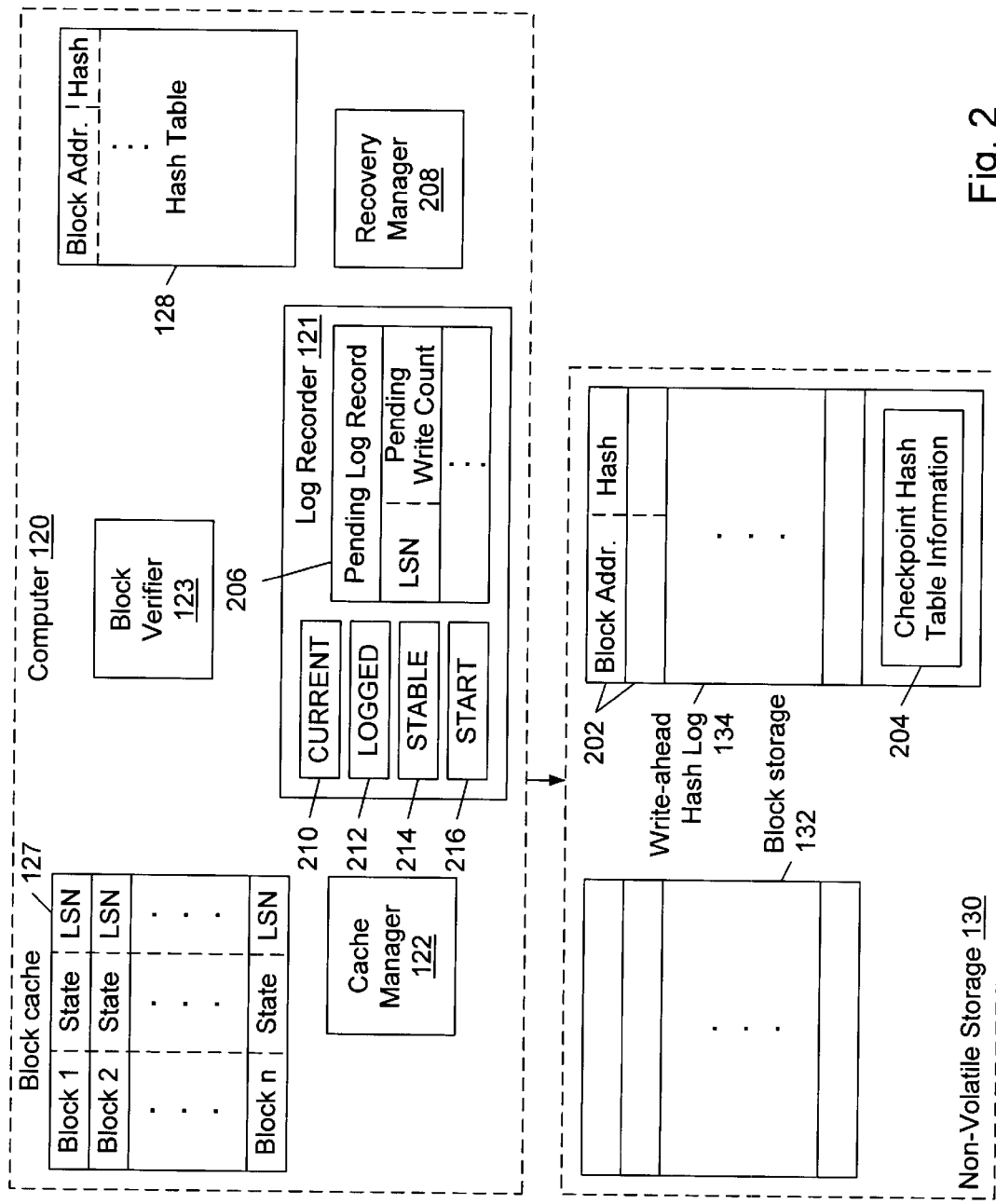
FIG. 2 is a functional block diagram illustrating aspects associated with one particular embodiment of a system employing a write-ahead hash log.

FIG. 2 is a functional block diagram illustrating aspects associated with one embodiment of system 100. Functional blocks that correspond to blocks of FIG. 1 are numbered identically for simplicity and clarity, and their operation in broad terms is similar.

As illustrated in the embodiment of FIG. 2, computer 120 includes particular implementations of log recorder 121, block cache 127 and hash table 128 as discussed generally in conjunction with FIG. 1. FIG. 2 also depicts particular implementations of cache manager 122, recovery manager 208, and block verifier 123 which were also discussed generally in conjunction with FIG. 3. The functionality of log recorder 121, cache manager 122, recovery manager 208 and block verifier 210 may be implemented in software code. In one embodiment, this software code is incorporated as a portion of the operating system of computer 120, and may be executed in one or more independent threads.

Figure 2A:
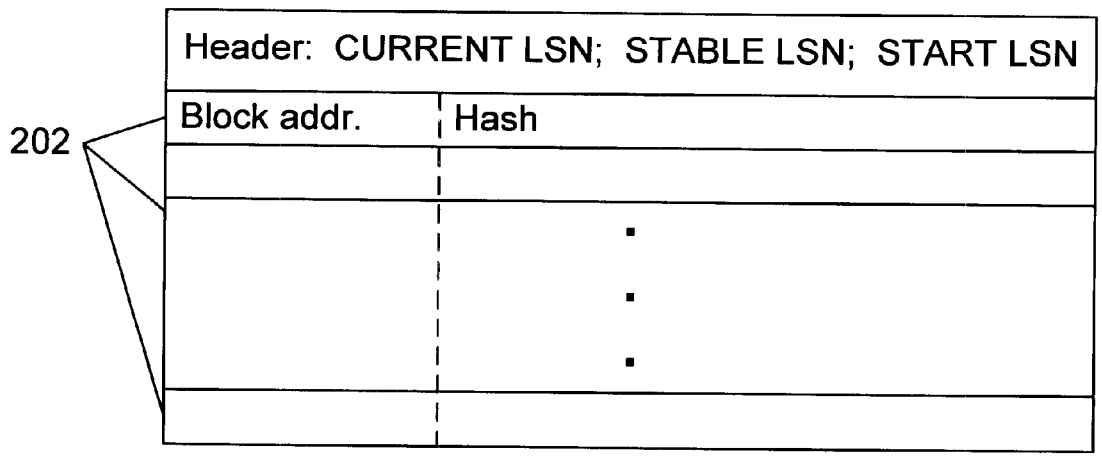
FIG. 2A illustrates a format associated with a log block according to one particular implementation of the system of FIG. 2.

FIG. 2 additionally illustrates details associated with one particular implementation of write-ahead hash log 134. More particularly, write-ahead hash log 134 is illustrated with a sequence of log records 202 each containing a data block address (or block number) and an associated hash value. In one particular implementation, these records are grouped into log blocks which are written to the write-ahead hash log 134 as a group in a single write operation. Log blocks, and implicitly the log records they contain, are identified by unique, monotonically increasing log sequence numbers (LSNs). FIG. 2A illustrates a format associated with a log block according to one particular implementation. Further details regarding this data structure will be provided below.

Write-ahead hash log 134 is further illustrated with checkpoint hash table information 204. Generally speaking, checkpoint hash table information 204 contains hash values corresponding to data blocks stored within block storage 132. The hash values may be stored with their corresponding block addresses. In the event a data block is modified in block cache 127 and a log record 202 containing an updated hash value for the data block has been stored in write-ahead hash log 134, checkpoint hash table information 204 will continue to contain the old hash value corresponding to the data block.

In the particular embodiment depicted by FIG. 2, log recorder 121 maintains a pending log record 206 which associates for each log block (identified by LSN value) and a pending write count which indicates the number of dirty cache blocks referenced in the log block but not yet written to disk. Log recorder 121 may also maintain several pointers containing log sequence number values depicted as CURRENT 210, LOGGED 212, STABLE 214 and START 216. CURRENT 210 indicates the highest log sequence number at that time for which creation of a log block to be stored to write-ahead hash log 134 has been started. LOGGED 212 indicates the highest log sequence number at that time for which a log write to write-ahead hash log 134 has finished. STABLE 214 indicates the maximum log sequence number for which all of the modified data blocks referenced by the LSN have been written to block storage 132. START 216 indicates the beginning of the active portion of write-ahead log 134.

As is also illustrated in FIG. 2, in this particular embodiment each data block stored in block cache 127 includes a field indicating the state of the data block and a log sequence number (LSN) which may be associated with the data block. The state information indicates whether a given data block is clean or dirty. A cached data block is marked dirty when the data block is modified, for example, by an application program being executed by CPU 122.

Operations associated with the particular embodiment of FIG. 2 will be described in conjunction with the flow diagrams of FIGS. 3–7. Referring collectively to these figures, when a write to a data block in block cache 127 occurs (step 302 of FIG. 3), if the associated data block was not already dirty (step 304), the LSN field associated with the data block in the block cache 127 is assigned a value CURRENT+1. The pending write count value maintained within pending log record 206 of log recorder 121 for the LSN associated with the entry in block cache 127 is also incremented (step 308). Similar operations may occur for other newly written cached data blocks within block cache 127.

Thus, at this point in the discussion, assume that the values CURRENT 210, LOGGED 212, STABLE 214, and START 216 as maintained by log recorder 121 are all equal, and are set to a value of "000" (for the sake of example). In such case, if writes are performed that newly modify Blocks 1 and 2 of block cache 127, the LSN field in block cache 127 for each of these data blocks is set to "001" (i.e., CURRENT+1). Log recorder 121 further creates an entry in pending log record 206 for the LSN value of "001", and increments the pending write count for that entry twice such that it increments from 0 to 2 (assuming no earlier cached data blocks containing that LSN value were already assigned in block code 127).

If a write occurs within block cache 127 to a data block that is already dirty (as determined in step 304), and if the LSN field associated with the data block in block cache 127 is equal to CURRENT+1 (step 310), no further action is taken. Accordingly, in the example above, if Block 1 of block cache 127 is written to again while the value of "001" is stored in its LSN field, no further action is taken.

If, on the other hand, the LSN field of the cache block contains a value which does not equal CURRENT+1, the pending write count value maintained in the pending log record 206 entry corresponding to the LSN value is decremented in step 312. The LSN field of the cache block is then updated to equal CURRENT+1, and the pending write counter maintained for that updated LSN entry in pending log record 206 is incremented. It is noted that the LSN field of a dirty cache block entry may not equal the value CURRENT+1 if a log block containing a log record corresponding to a previous modification of the cached data block was already written to write-ahead hash log 134, as described below.

Figure 3:
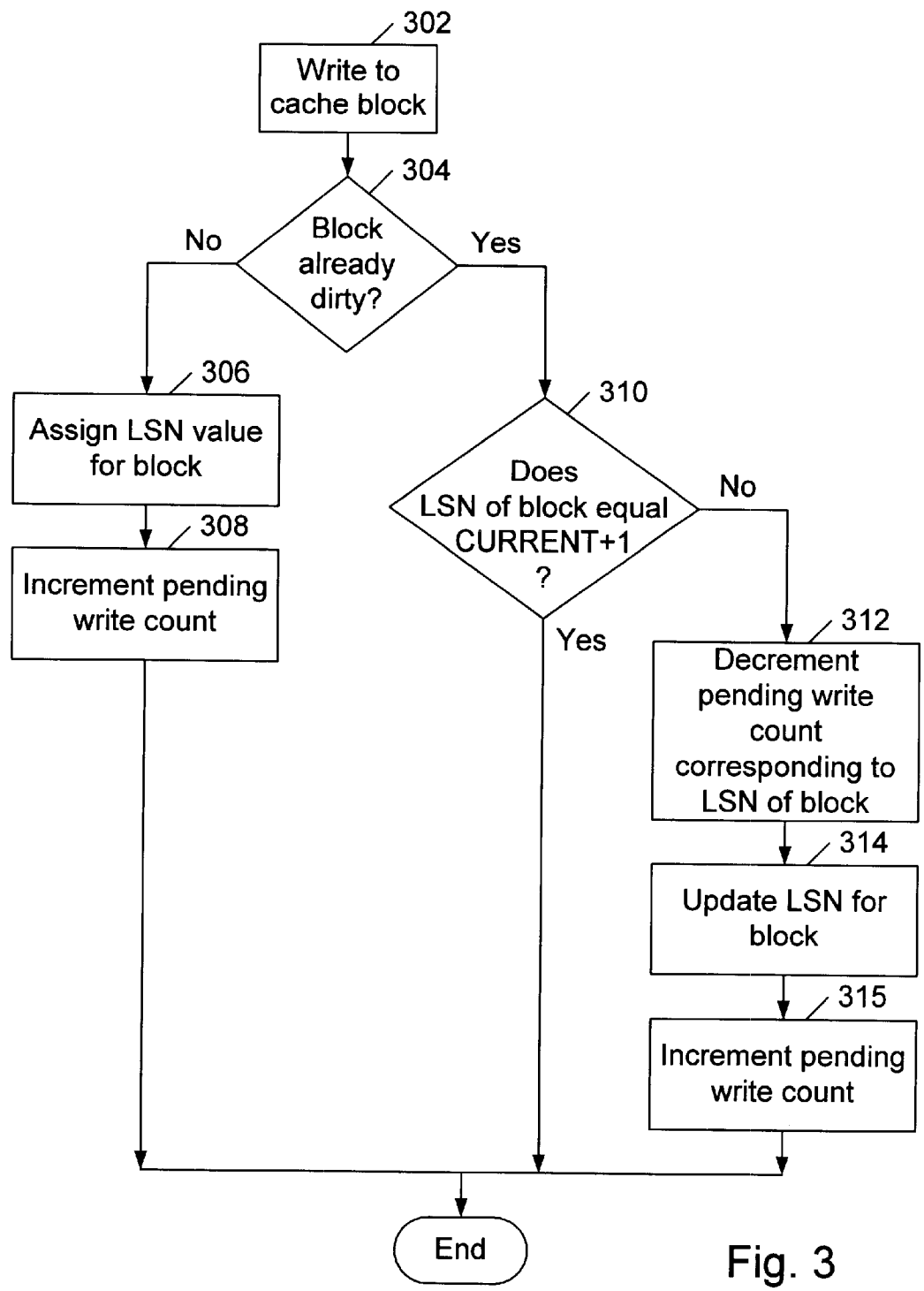
FIG. 3 is a flow diagram illustrating operations of the system of FIG. 2 in response to a write to a cache block.

It is additionally noted that the functionality depicted by FIG. 3 as described above may be implemented by software associated with log recorder 121. Such software may be executed in one or more independent threads.

Figure 4:
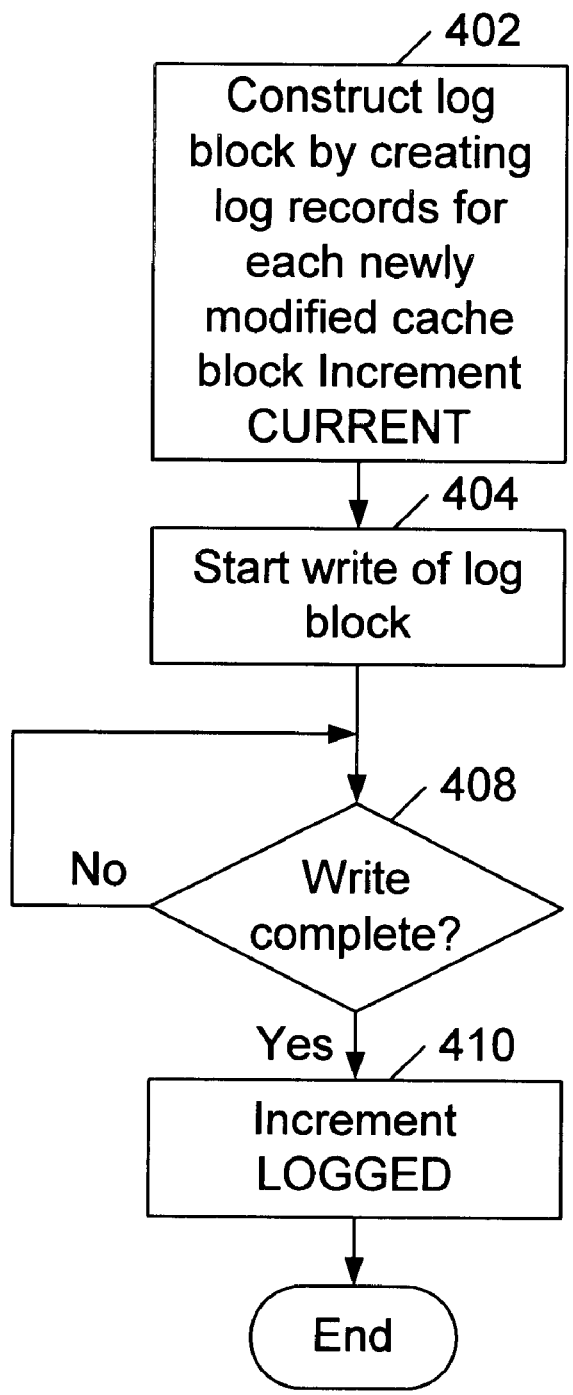
FIG. 4 is a flow diagram illustrating operations associated with one particular implementation of a log recorder.

At various times, log recorder 121 creates log records to be written to write-ahead hash log 134. As stated previously, in one particular implementation, log recorder 121 groups log records into a log block that is eventually written to write-ahead hash log 134 in a single write operation. A log block may be formatted in accordance with the data structure illustrated by FIG. 2A. A new log block is constructed by log recorder 121 by detecting newly modified data blocks from block cache 127 and recording each block address and its associated updated hash value (i.e., a hash value computed based on the modified data) in a log record (FIG. 4, step 402). In the illustrated log block, a header is included for storing the values of CURRENT 210 and STABLE 214 as they exist within log recorder 121 when the log block is created. The existing value of START 216 may also be stored in the header of the log block. When log recorder 121 begins the construction of a log block by gathering (or detecting) newly modified cache blocks and creating a log record for each, the value of CURRENT 210 is incremented.

After creating a log block, log recorder 121 begins the physical write of the log block to write-ahead hash log 134 (step 404). When the write is complete (step 408), log recorder 121 increments the value of LOGGED 212 (step 410). In this manner, it is noted that at this point in operation, a record containing an updated hash value for modified cache blocks is stored in non-volatile storage.

Thus, taking the previous example further, if blocks 1 and 2 of block cache 127 are modified and their LSN fields contain "001", when log recorder 121 begins creation of the next log block (which is identified by a log sequence number "001" equaling CURRENT+1), log recorder 121 creates log records for each of blocks 1 and 2 (including updated hash values), along with any other cached blocks in block cache 127 having a dirty state and identified with LSN entries of "001" the existing values of CURRENT 210 and STABLE 214, as well as that of START 216 (if included in the data structure) are further stored in the header of the log block. At this point in the example, the existing value of CURRENT 210 is "001", and the existing value of both STABLE 214 and START 216 is "000".

Figure 5:
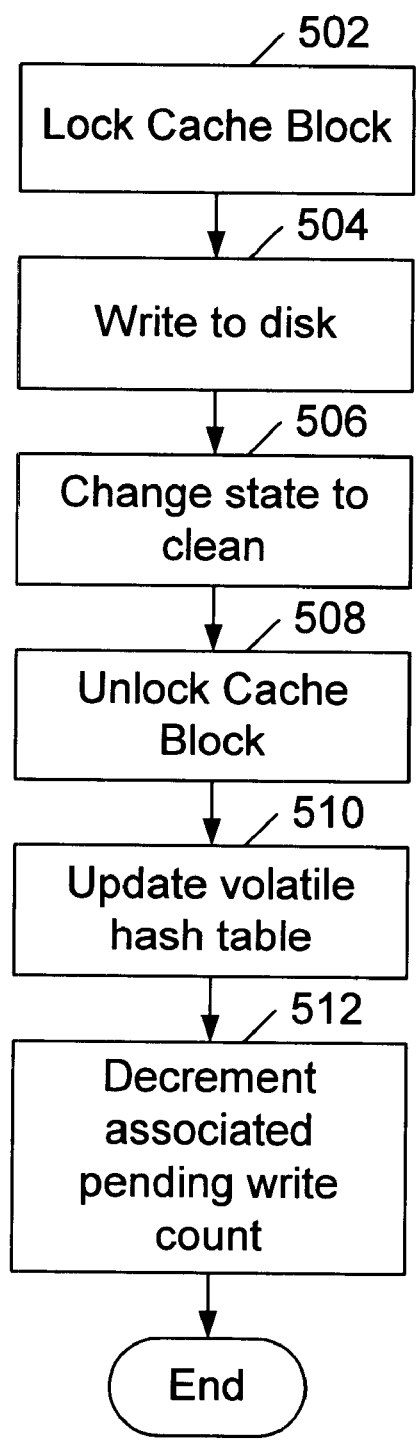
FIGS. 5 and 6 are flow diagrams illustrating operations of one particular implementation of a cache manager.

When a dirty data block in block cache 127 is to be written back to block storage 132, the cache block is locked to prevent asynchronous modification during the write (FIG. 5, step 502). When the write of the cached data block to block storage 132 completes (step 504), the state of the cached block is changed to clean (step 506) and the cache block is unlocked (step 508). In addition, as each write of a cache block to block storage 132 completes, the log recorder 121 writes the updated hash value corresponding to modified data block to hash table 128 with the data block address (step 510). Log recorder 121 additionally decrements the pending write count value in the entry of pending log record 206 that corresponds to the LSN field of the cache block (step 512). It is noted that in other embodiments, the hash table 128 may be updated with the new hash value at any point after it is calculated for example, in step 402.

Figure 6:
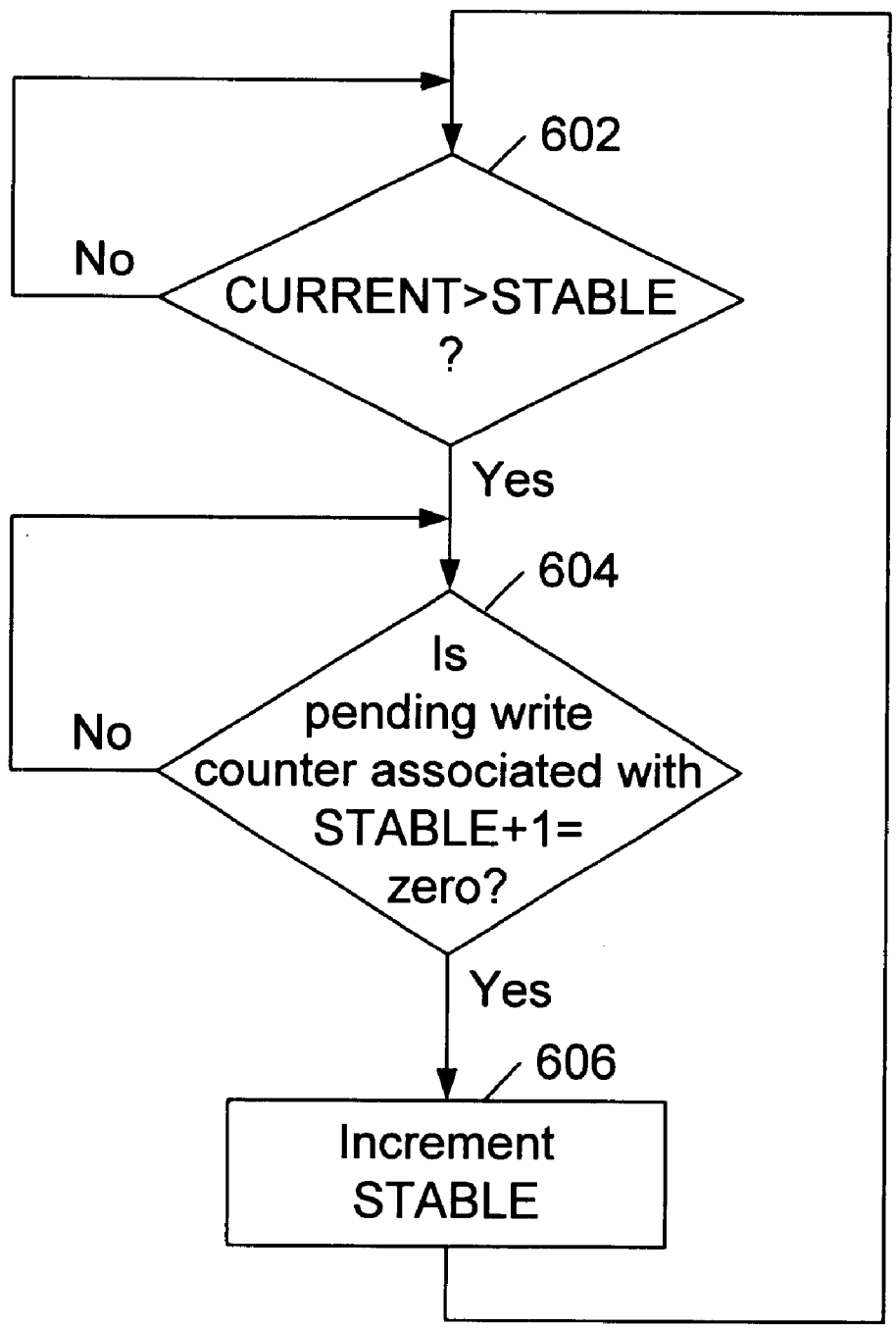

As illustrated in FIG. 6, if the value of CURRENT 210 is greater than the value of STABLE 214 (step 602), the value of STABLE 210 is incremented if the pending write count within the pending log record 206 entry corresponding to the log sequence number STABLE+1 is zero. As a result, all log records with sequence numbers no greater than STABLE are known to have been written to disk. For recovery purposes, a copy of the STABLE pointer is included in the header of each log block.

The functionality depicted by FIGS. 5 and 6 as described above may be implemented by code associated with cache manager 122. Such code may be executed in one or more independent threads.

Accordingly, and taking the previous example even further, and assume a log block including a header containing CURRENT LSN="001", STABLE LSN="000", and START LSN="000" is created by log recorder 121 and the write of the log block is initiated. Log recorder 121 increments the value of LOGGED 212 to "001" when confirmation of a successful write of the log block to write-ahead hash log 134 has been indicated. Such indication may be provided, for example, by way of an interrupt. At this point in the operation, the value of STABLE 214 remains "000" until and if all of the modified data blocks of block cache 127 containing LSN values of "001" are successfully written back to block storage 132. When all such data blocks have been written back, the pending write count value in the entry of pending log record 206 corresponding to the LSN of "001" reaches a value of 0. At this point, it is noted that the updated hash values contained in the records of the log block stored within write-ahead hash log 134 will be consistent with the corresponding data blocks in block storage 132.

During subsequent iterations, additional log records may be created by log recorder 121 in accordance with the foregoing. Since not all modified data blocks associated with log blocks that were written to write-ahead hash log 134 have necessarily been stored back to block storage 132, a given log block may have a header containing values for CURRENT, STABLE and START that are different from one another. In accordance with the particular implementation as described above, the values of CURRENT, LOGGED, STABLE, and START for any given instance follow the relationship START<=STABLE<=LOGGED<=CURRENT.

Figure 7:
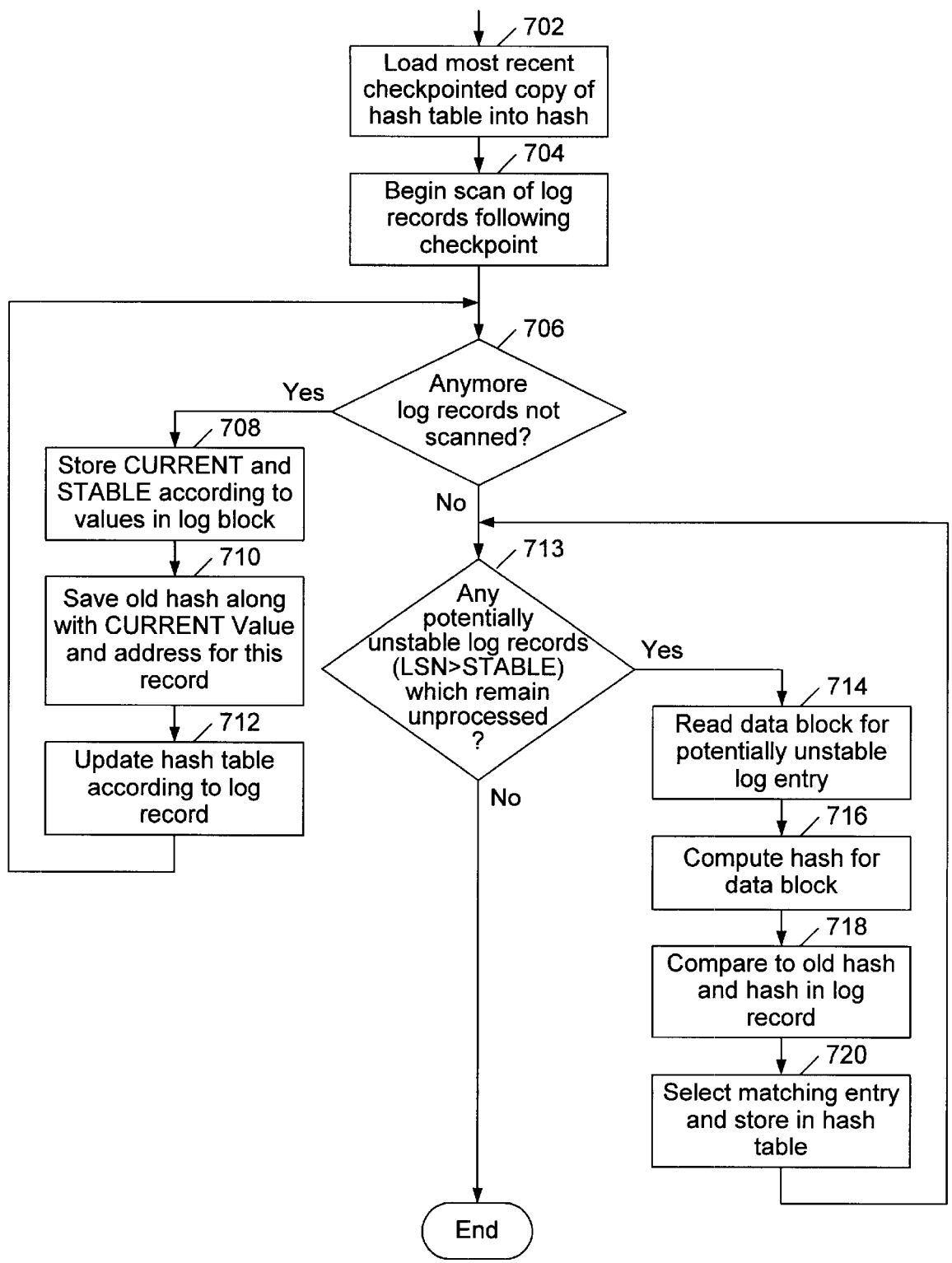
FIG. 7 is a flow diagram illustrating operations of one particular implementation of a recovery manager.

If a system or disk failure occurs and computer 120 crashes, the hash value information contained within hash table 128 is rebuilt from the records in write-ahead hash log 134. Recovery manager 208 is provided to perform this functionality. Recovery is performed by loading the contents of the most recent checkpoint hash table 204 contained in write-ahead hash log 134 into hash table 128 (FIG. 7, step 702). The most recent checkpoint hash table information 204 may be found by scanning the write-ahead hash log 134. Alternatively, the START value, if stored, may be used from the header of the most recently stored log block. Log blocks may be sequentially searched based on their CURRENT LSN values.

Recovery manager 208 then scans each log block in the log starting from the checkpoint to find the newest records. When the scan is initiated (step 704), log recorder 121 iteratively performs steps 708, 710, and 712 for each log block in write-ahead hash log 134 that is subsequent to the most recent checkpoint information until the most recent log block is reached. On each iteration, the values of CURRENT and STABLE in the log block are stored as the values of the pointers CURRENT 210 and STABLE 214 in log recorder 121. In addition, log recorder 121 stores the old hash value currently in the hash table 128 (which is the image of the value in checkpoint hash value information 204) along with the CURRENT value and address for this record. This old hash value information may be stored in a table created in a region of volatile memory 124. Subsequently, the hash table 128 is updated according to the updated hash value for the log record along with the corresponding data block address. Information from log records in write-ahead hash log 134 is treated similarly until the most recent record has been processed.

As stated previously, since the log records contained in write-ahead hash log 134 are written before the actual data block stored in block storage 132, newly updated hash values in records stored in the write-ahead hash log 134 may not reflect what is actually stored within the block storage 132 of non-volatile storage 1130. The recovery manager 208 deals with this uncertainty by determining whether any potentially unstable log entries corresponding to records in write-ahead hash log 134 exist (step 713). For any log records with LSN values that are less than or equal to the value of STABLE 214 then existing in log recorder 121, it is known that the corresponding data block has been successfully written to block storage 132. Thus, no further action need be taken for that log record. However, for any log records with LSN values that are greater than the value of STABLE 214, the data block corresponding to the address is read from block storage 132 (step 714) and a new hash value is computed for the data block (step 716). Recovery manager 208 then compares the old hash value (as stored in Step 710) and the hash value in the log record to the recomputed hash (step 718). The hash value which matches the recomputed hash value is selected and stored in the hash table (step 720), along with the block address. This process repeats for all records in log blocks identified by CURRENT values that are greater than the existing value of STABLE. After all such records have been processed according to steps 714, 716, 718, and 720, the process completes. It is noted that in step 718, if neither the old hash value nor the updated hash value (as was stored in the log record) equals the recomputed hash value, an error may be indicated.

Log recorder 121 may periodically store updated checkpoint hash table information within write-ahead hash log 134. This may be achieved by copying the current contents of hash table 128 into a region of write-ahead hash log 134, and reinserting any log records corresponding to logical blocks that have not yet reached a stable state subsequent to the checkpoint. This regeneration of logical records insures that the portion of the log prior to the checkpoint can be discarded and reused, as is necessary given finite space for logging.

It is noted that while in the embodiment described above in conjunction with FIGS. 2-7, log recorder 121 stores log records to write-ahead hash log 134 in groups formed by individual log blocks, alternative embodiments are possible and contemplated in which log records containing updated hash values for modified data blocks in block cache 127 are stored to write-ahead hash log 134 separately. In such embodiments, log recorder 121 may not maintain a pending log record containing pending log counts.

It is also noted that while in the above embodiment, the log recorder 121 of FIG. 2 maintains for particular instances in time both a value indicative of the most recent log records that have been created (e.g., the pointer value CURRENT 210), as well as a value indicative of log records for which a write to write-ahead hash log 134 has completed (e.g., the pointer value LOGGED 212), other embodiments are also contemplated which do not maintain one or both of these values. For example, in one alternative embodiment, log recorder 121 maintains a value indicative of log records for which a write to writeahead hash log 134 has been initiated.

Additionally, it is further noted that in the above embodiment, the value of the STABLE LSN as ultimately stored with each log block (or log record) is generally indicative of log records stored in write-ahead hash log 134 for which corresponding modified cached data blocks have been successfully stored back to block storage 132. In addition, the value of the CURRENT LSN as ultimately stored with each log block (or log record) is generally indicative of an ordering of the log block (or log record) with respect to other log blocks (or log records) in write-ahead hash log.

Furthermore, the manner in which recovery manager 208 rebuilds hash table 128 following a crash may vary in other embodiments from the operations depicted by FIG. 7. For example, in one alternative embodiment, recovery manager 208 rebuilds hash table 128 by retrieving the checkpoint hash table information from write-ahead hash log 134 in addition to each subsequent log record, and updates the hash table 128 after modifying the checkpoint hash table information according to each of the subsequent log records. In such an embodiment, a determination as to which log records may be unstable (that is, which log records have updated hash values for which an associated dirty data block was not yet written to block storage 132.

Various embodiments may further include receiving, sending or storing software and/or data implemented in accordance with the foregoing descriptions of log. recorder 121, cache manager 122, recovery manager 208, block verifier 210, and/or write-ahead hash log 134 upon a carrier medium. Generally speaking, a carrier medium may include storage media or memory media such as magnetic or optical media, e;g., floppy disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a non-volatile block storage for storing data blocks;
a block cache for storing cached copies of said datablocks;
a log recorder configured to store an updated hash value corresponding to a modified cache block within a non-volatile log storage; and
a cache manager configured to write-back said modified cache block to said non-volatile block storage after said hash value corresponding to said modified cache block is stored within said non-volatile log storage.

2. The system as recited in claim 1 wherein said log recorder is configured to create a log record including said updated hash value and an address corresponding to said modified cache block, and wherein said log recorder is configured to store said log record within said non-volatile log storage.

3. The system as recited in claim 2 wherein said log recorder is further configured to store a log sequence number corresponding to said log record in said non-volatile log storage, wherein said log sequence number is indicative of an order of storage of said log record relative to other log records.

4. The system as recited in claim 3 wherein said log recorder is further configured to store a first value within said log record indicative of one or more previous log records within said non-volatile log storage for which one or more corresponding modified code blocks have been written back to said non-volatile block storage.

5. The system as recited in claim 4 wherein said log recorder is further configured to store a plurality of log records in a log block to said non-volatile log storage.

6. The system as recited in claim 5 wherein said log recorder further maintains a pending write count indicative of a number of modified cache blocks to be written back to non-volatile log storage.

7. The system as recited in claim 1 further comprising a hash table stored in a volatile memory, wherein said hash table includes a plurality of hash values corresponding to said data blocks.

8. The system as recited in claim 7 further comprising a block verifier configured to compare a hash value from said hash table to a recomputed hash value computed from a corresponding data block read from said non-volatile block storage.

9. The system as recited in claim 1 wherein said block cache includes a log sequence number corresponding to each cached copy of said data blocks.

10. The system as recited in claim 1 wherein said log recorder is configured to maintain a first pointer value indicative of log records that have been stored to said non-volatile log storage.

11. The system as recited in claim 10 wherein said log recorder is further configured to maintain a second pointer value indicative of the most recent log record stored in said non-volatile log storage for which a corresponding modified cache block has been stored to said non-volatile block storage.

12. A method of storing data blocks in a storage system comprising:

storing a data block in a block cache; calculating a hash value corresponding to said data block;

storing said hash value in a non-volatile log;

storing said data block in a non-volatile storage after storing said hash value.

13. The method as recited in claim 12 further comprising:

storing an original hash value corresponding to said data block in a volatile memory; and using said original hash value to detect an error in said data block.

14. The method as recited in claim 13 further comprising modifying said data block in said block cache.

15. The method as recited in claim 14 wherein said hash value is an updated hash value based upon said data block following modification.

* * * * *

UNITED STATES PATENT AND TRADEMARK OFFICE
CERTIFICATE OF CORRECTION

PATENT NO.     : 6,629,198 B2
DATED          : September 30, 2003
INVENTOR(S)    : John H. Howard It is certified that error appears in the above-identified patent and that said Letters Patent is hereby corrected as shown below:

<u>Title page,</u>
Item [*] Notice, delete the phrase "by 311 days" and insert -- by 307 days --

Signed and Sealed this

Twenty-first Day of December, 2004

JON W. DUDAS
*Director of the United States Patent and Trademark Office*